(12) United States Patent
Yokoyama (10) Patent No.: US 11,513,357 B2
(45) Date of Patent: Nov. 29, 2022

(54) IMAGE DISPLAY DEVICE FOR PROVIDING UNIFORM BRIGHTNESS IN VIRTUAL IMAGE

(71) Applicant: SEIKO EPSON CORPORATION, Tokyo (JP)

(72) Inventor: Osamu Yokoyama, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/942,095

(22) Filed: Jul. 29, 2020

(65) Prior Publication Data
US 2021/0033869 A1 Feb. 4, 2021

(30) Foreign Application Priority Data
Jul. 30, 2019 (JP) .............................. JP2019-139499

(51) Int. Cl.
*G02B 27/01* (2006.01)
*H04N 9/31* (2006.01)
*F21V 8/00* (2006.01)

(52) U.S. Cl.
CPC ........ *G02B 27/0172* (2013.01); *G02B 6/0011* (2013.01); *G02B 27/0103* (2013.01); *H04N 9/3161* (2013.01); *G02B 2027/0109* (2013.01); *G02B 2027/0174* (2013.01); *G02B 2027/0178* (2013.01)

(58) Field of Classification Search
CPC .............. G02B 27/0172; G02B 6/0011; G02B 27/0103; G02B 2027/0109; G02B 2027/0174; G02B 2027/0178; H04N 9/3161
See application file for complete search history.

(56) References Cited

U.S. PATENT DOCUMENTS 7,573,640 B2 * 8/2009 Nivon ................ G02B 27/4216
359/630
10,156,725 B2 * 12/2018 TeKolste .............. G02B 6/0026
(Continued)

FOREIGN PATENT DOCUMENTS

CN 108254918 A 7/2018
JP 2015-194550 A 11/2015
(Continued)

*Primary Examiner* — Kwang-Su Yang
(74) *Attorney, Agent, or Firm* — Oliff PLC (57) ABSTRACT

An image display device includes, an imaging light generation part configured to generate an imaging light having a single color, a light-guiding plate, an incident side diffraction element provided at a light incident part of the light-guiding plate, and configured to cause the imaging light to enter the light-guiding plate, an exit side diffraction element provided at a light emitting part of the light-guiding plate, and configured to cause the imaging light propagating within the light-guiding plate to exit, and an angle dependent reflective film provided between the light-guiding plate and the exit side diffraction element, and having a reflectance varying depending on magnitude of a propagation angle of the imaging light, in which the reflectance for the imaging light propagating at a relatively small propagation angle is larger than the reflectance for the imaging light propagating at a relatively large propagation angle.

7 Claims, 7 Drawing Sheets

(56) References Cited

U.S. PATENT DOCUMENTS

| | | | |
|---|---|---|---|
| 2006/0126179 A1* | 6/2006 | Levola | G02B 27/4272 |
| | | | 359/563 |
| 2016/0124223 A1 | 5/2016 | Shinbo et al. | |
| 2016/0124229 A1 | 5/2016 | Yokoyama | |
| 2017/0371090 A1* | 12/2017 | Fattal | G02F 1/133615 |
| 2018/0180892 A1 | 6/2018 | Yoshida | |

FOREIGN PATENT DOCUMENTS

| JP | 2016-85426 A | 5/2016 |
|---|---|---|
| JP | 2016-85430 A | 5/2016 |

\* cited by examiner

IMAGE DISPLAY DEVICE FOR PROVIDING UNIFORM BRIGHTNESS IN VIRTUAL IMAGE

The present application is based on, and claims priority from JP Application Serial Number 2019-139499, filed Jul. 30, 2019, the disclosure of which is hereby incorporated by reference herein in its entirety.

BACKGROUND

1. Technical Field

The present disclosure relates to an image display device.

2. Related Art

In recent years, a wearable image display device such as a head-mounted display has been focused on. As such an image display device, there is a technique that includes an incident side diffraction element and an exit side diffraction element formed at a front surface of a light-guiding plate, and a virtual image is displayed by propagating imaging light captured into the light-guiding plate from the incident side diffraction element and extracting the imaging light outward from the exit side diffraction element (see, for example, JP-A-2016-85426).

In the image display device described above, diffraction efficiency of the exit side diffraction element varies depending on magnitude of a propagation angle of the light propagating within the light-guiding plate, and thus there has been a problem in that brightness of the imaging light exited from the exit side diffraction element is uneven.

SUMMARY

In order to solve the problem described above, an image display device according to a first aspect of the present disclosure includes, an imaging light generation part configured to generate imaging light having a single color, a light-guiding plate, an incident side diffraction element provided at a light incident part of the light-guiding plate, and configured to cause the imaging light to enter the light-guiding plate, an exit side diffraction element provided at a light emitting part of the light-guiding plate, and configured to cause the imaging light propagating within the light-guiding plate to exit, and an angle dependent reflective film provided between the light-guiding plate and the exit side diffraction element, and having reflectance varying depending on magnitude of a propagation angle of the imaging light propagating within the light-guiding plate, wherein reflectance of the angle dependent reflective film for the imaging light propagating at a relatively small propagation angle is larger than reflectance of the angle dependent reflective film for the imaging light propagating at a relatively large propagation angle.

An image display device according to a second aspect of the present disclosure includes, an imaging light generation part configured to generate imaging light including first colored light, second colored light, and third colored light, a first light-guiding plate, a first incident side diffraction element provided at a first light incident part of the first light-guiding plate, and on which the first colored light is incident, a first exit side diffraction element provided at a first light emitting part of the first light-guiding plate, and configured to cause the first colored light propagating within the first light-guiding plate to exit, a first angle dependent reflective film provided between the first light-guiding plate and the first exit side diffraction element, and having reflectance varying depending on magnitude of a propagation angle of the first colored light propagating within the first light-guiding plate, a second light-guiding plate, a second incident side diffraction element provided at a second light incident part of the second light-guiding plate, and on which the second colored light is incident, a second exit side diffraction element provided at a second light emitting part of the second light-guiding plate, and configured to cause the second colored light propagating within the second light-guiding plate to exit, a second angle dependent reflective film provided between the second light-guiding plate and the second exit side diffraction element, and having reflectance varying depending on magnitude of a propagation angle of the second colored light propagating within the second light-guiding plate, a third light-guiding plate, a third incident side diffraction element provided at a third light incident part of the third light-guiding plate, and on which the third colored light is incident, a third exit side diffraction element provided at a third light emitting part of the third light-guiding plate, and configured to cause the third colored light propagating within the third light-guiding plate to exit, and a third angle dependent reflective film provided between the third light-guiding plate and the third exit side diffraction element, and having reflectance varying depending on magnitude of a propagation angle of the third colored light propagating within the third light-guiding plate, wherein reflectance of the first angle dependent reflective film for the first colored light propagating within the first light-guiding plate at a relatively small propagation angle is larger than reflectance of the first angle dependent reflective film for the first colored light propagating within the first light-guiding plate at a relatively large propagation angle, reflectance of the second angle dependent reflective film for the second colored light propagating within the second light-guiding plate at a relatively small propagation angle is larger than reflectance of the second angle dependent reflective film for the second colored light propagating within the second light-guiding plate at a relatively large propagation angle, and reflectance of the third angle dependent reflective film for the third colored light propagating within the third light-guiding plate at a relatively small propagation angle is larger than reflectance of the third angle dependent reflective film for the third colored light propagating within the third light-guiding plate at a relatively large propagation angle.

In the above first aspect, at least one of the incident side diffraction element and the exit side diffraction element may be a surface relief type diffraction grating.

In the above first aspect, at least one of the incident side diffraction element and the exit side diffraction element may be a volume hologram.

In the second aspect, at least one of the first incident side diffraction element, the second incident side diffraction element, the third incident side diffraction element, the first exit side diffraction element, the second exit side diffraction element, and the third exit side diffraction element may be a surface relief type diffraction grating.

In the second aspect, at least one of the first incident side diffraction element, the second incident side diffraction element, the third incident side diffraction element, the first exit side diffraction element, the second exit side diffraction element, and the third exit side diffraction element may be a volume hologram.

In the first aspect or the second aspect, a light source for the imaging light may be laser light.

DESCRIPTION OF EXEMPLARY EMBODIMENTS

Exemplary embodiments of the present disclosure will be described in detail below with reference to the accompanying drawings.

Note that, in the drawings used for the following descriptions, characteristic portions are expanded for convenience to make characteristics easily comprehensible in some cases, thus dimension ratios among respective constituent elements or the like are not necessarily the same as actual dimension ratios.

First Exemplary Embodiment

An image display device according to an exemplary embodiment is a see-through type head-mounted display with which an image and an external world are visible. That is, the display device makes an observer recognize the image as a virtual image, and makes the observer observe an external image as see-through light.

Figure 1:
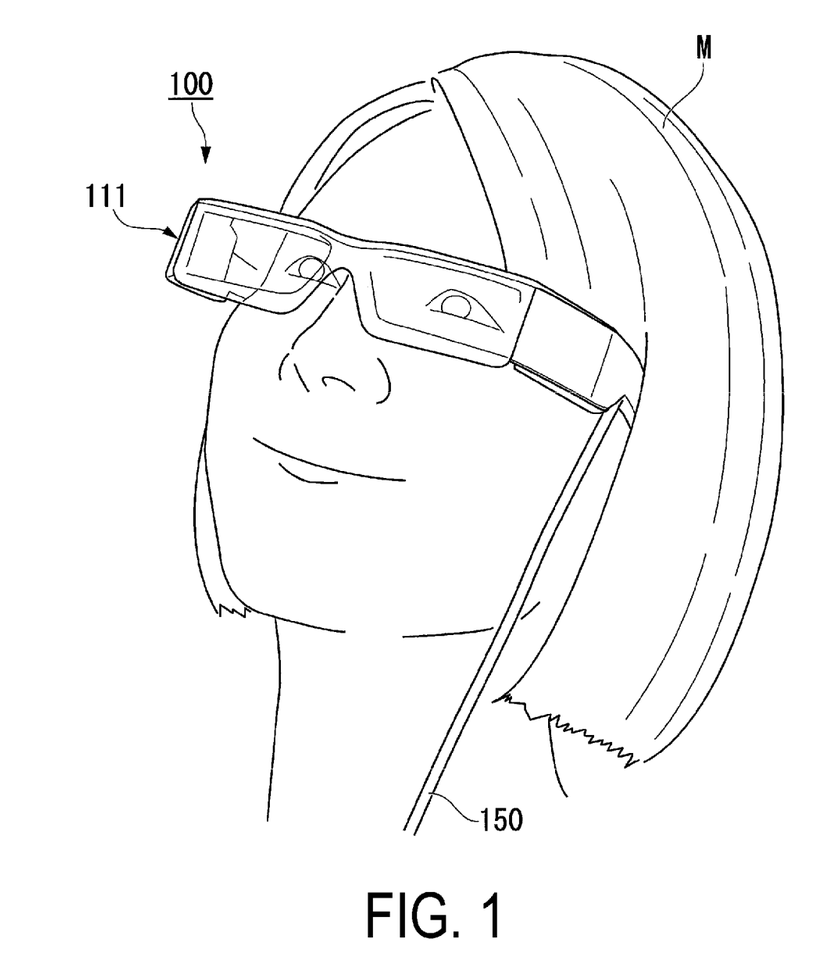
FIG. 1 is a diagram illustrating a state in which an observer wears an image display device according to an exemplary embodiment.
Figure 2:
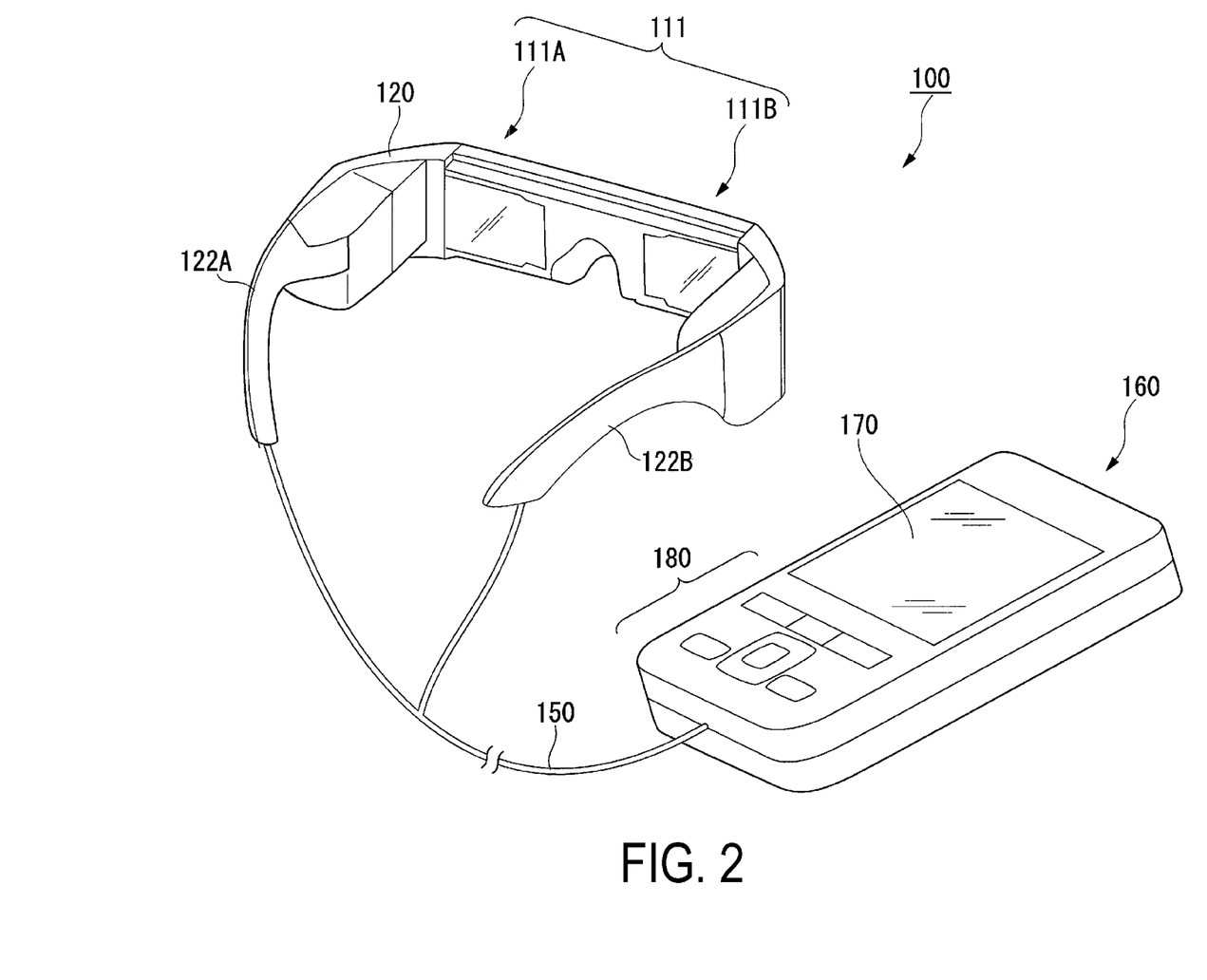
FIG. 2 is a perspective view of the image display device according to the exemplary embodiment.

FIG. 1 is a diagram illustrating a state in which the observer wears the image display device according to the exemplary embodiment. FIG. 2 is a perspective view of the image display device according to the exemplary embodiment.

As illustrated in FIG. 1, an observer M uses an image display device 100 according to the exemplary embodiment, while wearing the device on a head, as in a case of wearing glasses.

As illustrated in FIG. 2, the image display device 100 includes a display unit 111 having a glasses-like shape, and a controller 160 having a size small enough for the observer to be capable of holding with a hand. The display unit 111 and the controller 160 are communicatively connected with each other, by wire, or wireless. In the exemplary embodiment, each of an image display unit for left eye 111A and an image display unit for right eye 111B configuring the display unit 111, and the controller 160 are communicatively connected by wire via a cable 150, and communicate an image signal, a enable signal, or the like.

The display unit 111 includes a main frame 120, the image display unit for the left eye 111A, and the image display unit for the right eye 111B. The controller 160 includes a display screen unit 170, and an operation button unit 180.

For example, the display screen unit 170 displays various types of information, instructions, or the like to give to the observer. The main frame 120 includes a pair of temple portions 122A and 122B to hang on ears of the observer. The main frame 120 is a member for supporting the image display unit for the left eye 111A and the image display unit for the right eye 111B.

The image display unit for the right eye 111B and the image display unit for the left eye 111A have similar configurations, and respective constituent elements in both of the display units 111 are symmetrically disposed. Thus, in the following, the image display unit for the left eye 111A will be described simply as an image display unit 112 in detail, and a description of the image display unit for right eye 111B will be omitted.

Figure 3:
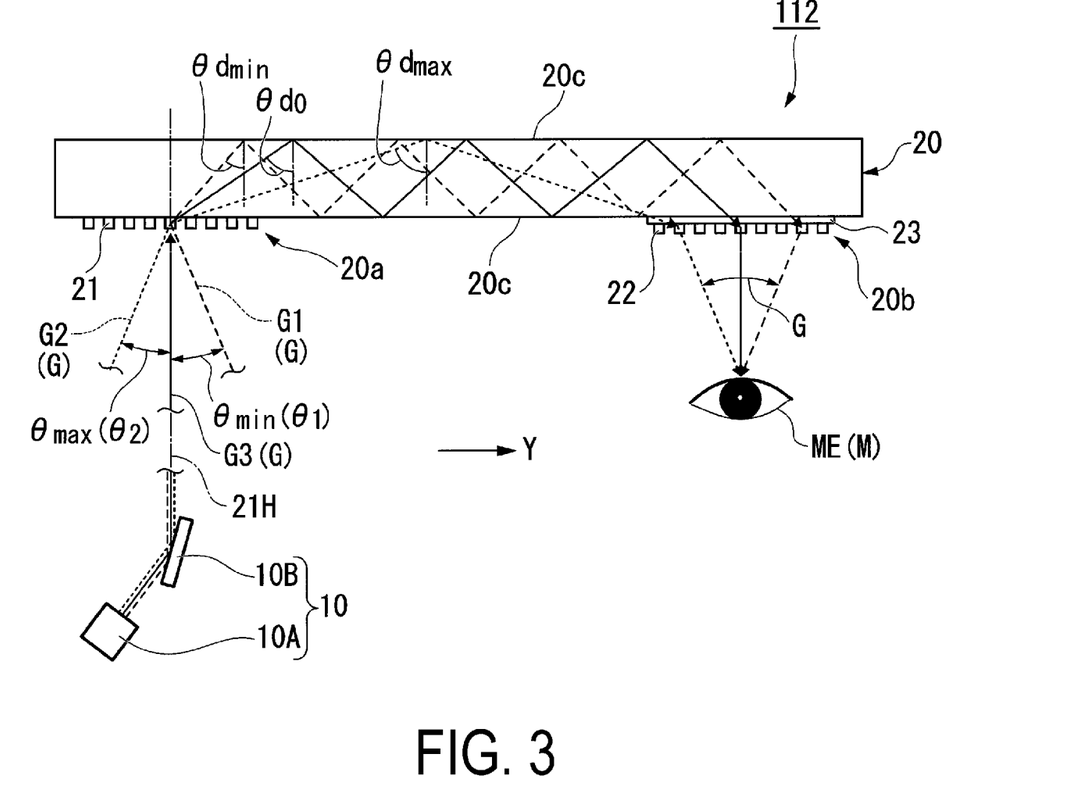
FIG. 3 is a horizontal cross-sectional view illustrating a schematic configuration of an image display unit.

FIG. 3 is a horizontal cross-sectional view illustrating a schematic configuration of the image display unit.

As illustrated in FIG. 3, the image display unit 112 includes an imaging light generation part 10, a light-guiding plate 20, an incident side diffraction element 21, an exit side diffraction element 22, and an angle dependent reflective film 23. The imaging light generation part 10 includes a light source 10A and an MEMS mirror 10B. The light source 10A includes a laser light source that emits monochromatic laser light. In the exemplary embodiment, the light source 10A emits green laser light having a peak wavelength of 520 nm, for example. The MEMS mirror 10B is constituted by a micromirror, and causes reflected laser light incident on the light-guiding plate 20 via a condensing lens (not illustrated).

An image signal from a control unit (not illustrated) is inputted to the imaging light generation part 10. The imaging light generation part 10 generates monochromatic (green) imaging light G, by scanning laser light exited from the light source 10A by the MEMS mirror 10B, and making the laser light incident on the light-guiding plate 20 in a time sequential manner via a condensing lens (not illustrated).

Accordingly, the imaging light generation part 10 generates the imaging light G in accordance with the image signal, and emits the imaging light G toward the light-guiding plate 20. As described above, in the exemplary embodiment, the imaging light G is configured by the MEMS mirror 10B scanning the laser light. Accordingly, the imaging light G is incident on the light-guiding plate 20 in a state of having predetermined amplitude (deflection angle).

The light-guiding plate 20 of the exemplary embodiment is a transparent optical glass. Note that, a transparent optical plastic may be used for the first light-guiding plate 20, or a cyclic polyolefin polymer resin, an acrylic resin, polycarbonate, or the like can also be used.

The light-guiding plate 20 includes a light incident part 20a and a light emitting part 20b. The incident side diffraction element 21 is provided at the light incident part 20a of the light-guiding plate 20. The exit side diffraction element 22 is provided at the light emitting part 20b of the light-guiding plate 20.

The incident side diffraction element 21 diffracts the imaging light G and causes the imaging light G incident on the light-guiding plate 20. The light-guiding plate 20 propagates the imaging light G introduced therein, by total reflection as described below. The exit side diffraction element 22 extracts imaging light G propagating within the light-guiding plate 20 by the total reflection, and guides the imaging light G to an eye ME of the observer M. The imaging light G is visible as a virtual image to the eye ME of the observer M.

The incident side diffraction element 21 and the exit side diffraction element 22 can be appropriately selected from a surface relief type diffraction grating or a volume hologram depending on required performance. The surface relief type diffraction grating has an advantage that high diffraction efficiency can be maintained over a wide angle range. In addition, the volume hologram has an advantage that high diffraction efficiency can be obtained.

In the exemplary embodiment, the incident side diffraction element 21 and the exit side diffraction element 22 are each constituted by the surface relief type diffraction grating.

The imaging light G is incident on the incident side diffraction element 21 of the light-guiding plate 20 at an incident angle ranging from $\theta_1$ to $\theta_2$. Here, in the imaging light G incident on the incident side diffraction element 21, the incident angle $\theta_1$ is an incident angle having a largest absolute value among incident angles of light rays incident in directions approaching the exit side diffraction element 22 respectively, with respect to a normal line 21H of the incident side diffraction element 21. In the imaging light G incident on the incident side diffraction element 21, the incident angle $\theta_2$ is an incident angle having a largest absolute value among incident angles of light rays incident in directions separating from the exit side diffraction element 22 respectively, with respect to the normal line 21H of the incident side diffraction element 21.

For the incident angle $\theta_1$ and the incident angle $\theta_2$, a positive direction is defined to be a clockwise direction with respect to the normal line 21H of the incident side diffraction element 21. Thus, the incident angle $\theta_1$ and the incident angle $\theta_2$ have an identical absolute value, and the incident angle $\theta_1$ that is in a counterclockwise direction with respect to the normal line 21H is a negative value, and the incident angle $\theta_2$ that is in the clockwise direction with respect to the normal line 21H is a positive value.

Hereinafter, for convenience, the incident angle $\theta_1$ is referred to as a minimum incident angle $\theta_{min}$, and the incident angle $\theta_2$ is referred to as a maximum incident angle $\theta_{max}$ in some cases.

The imaging light G that is diffracted by the incident side diffraction element 21 and incident on the light-guiding plate 20 is totally reflected by a front surface 20c of the light-guiding plate 20, and propagates within the light-guiding plate 20 at a predetermined propagation angle. Here, the propagation angle of the imaging light G is an incident angle of the imaging light G with respect to the front surface 20c of the light-guiding plate 20.

Imaging light G1 incident on the incident side diffraction element 21 at the minimum incident angle $\theta_{min}$ is diffracted by the incident side diffraction element 21, and propagates within the light-guiding plate 20 at a minimum propagation angle $\theta d_{min}$. In the exemplary embodiment, the minimum propagation angle $\theta d_{min}$ is set to be larger than a critical angle of the light-guiding plate 20, and the imaging light G1 propagates within the light-guiding plate 20 while being totally reflected. The imaging light G1 propagating within the light-guiding plate 20 at the minimum propagation angle $\theta d_{min}$ propagates in a standing state with respect to front surface 20c of light-guiding plate 20.

Additionally, imaging light G2 incident on the incident side diffraction element 21 at the maximum incident angle $\theta_{max}$ is diffracted by the incident side diffraction element 21, and propagates within the light-guiding plate 20 at a maximum propagation angle $\theta d_{max}$. In the exemplary embodiment, the maximum propagation angle $\theta d_{max}$ is set to be larger than the critical angle of the light-guiding plate 20, and the imaging light G2 propagates within the light-guiding plate 20 while being totally reflected. The imaging light G2 propagating within the light-guiding plate 20 at the maximum propagation angle $\theta d_{max}$ propagates in a lying state with respect to front surface 20c of light-guiding plate 20.

Note that, imaging light G3 incident on the incident side diffraction element 21 at an incident angle of 0° between the minimum incident angle $\theta_{min}$ and the maximum incident angle $\theta_{max}$, is diffracted by the incident side diffraction element 21, and propagates within the light-guiding plate 20 at a propagation angle $\theta d_0$ between the minimum propagation angle $\theta d_{min}$ and the maximum propagation angle $\theta d_{max}$. In the exemplary embodiment, the propagation angle $\theta d_0$ is set to be larger than the critical angle of the light-guiding plate 20, and the imaging light G3 propagates within the light-guiding plate 20 while being totally reflected.

The imaging light G1 to G3 propagate within the light-guiding plate 20 while being totally reflected, are diffracted by the exit side diffraction element 22, and are extracted outside. In the exemplary embodiment, respective grating periods of the incident side diffraction element 21 and the exit side diffraction element 22 are identical to each other. Thus, respective exit angles of the imaging light G1 to G3 exited from the exit side diffraction element 22 are identical to respective incident angles of the imaging light G1 to G3 incident on the incident side diffraction element 21, respectively. Thus, $\theta_{max} - \theta_{min}$ is an angle of view of the imaging light G that determines a size of a virtual image.

Incidentally, diffraction efficiency of the exit side diffraction element 22 varies depending on magnitude of a propagation angle of the imaging light G within the light-guiding plate 20.

Hereinafter, a configuration will be described as an example in which the exit side diffraction element 22 is directly formed at the front surface 20c of the light-guiding plate 20.

Figure 4:
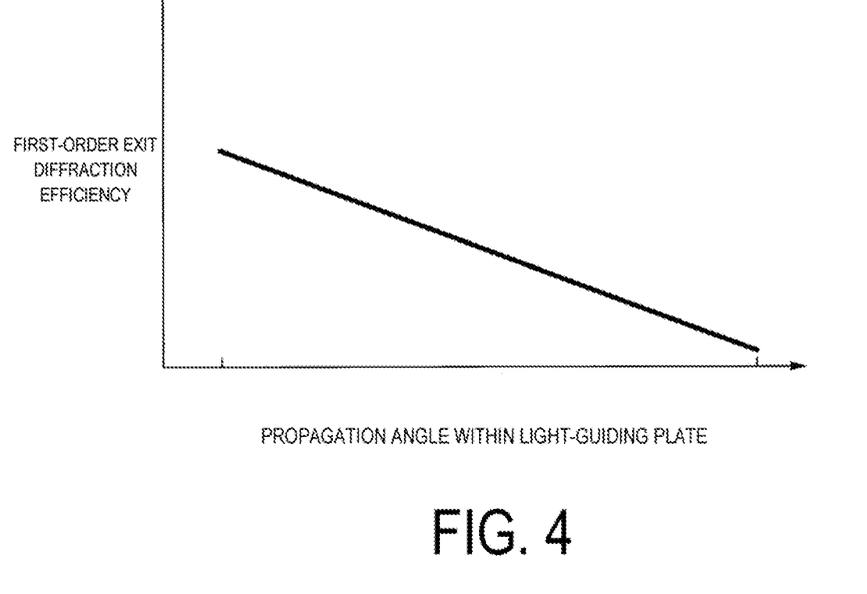
FIG. 4 is a diagram qualitatively showing propagation angle dependency of diffraction efficiency of an exit side diffraction element.

FIG. 4 is a diagram showing a relationship between propagation angle within a light-guiding plate and diffraction efficiency in an exit side diffraction element. Specifically, FIG. 4 is a diagram qualitatively showing propagation angle dependency within a light-guiding plate of the diffraction efficiency of the exit side diffraction element 22.

In FIG. 4, a horizontal axis indicates the propagation angle of the imaging light G in the light-guiding plate 20, and a vertical axis indicates first-order diffraction efficiency of the exit side diffraction element 22. Note that, the first-order diffraction efficiency of the exit side diffraction element 22 means a percentage of first-order diffraction light that is exited outward from the light-guiding plate 20 by being diffracted by the exit side diffraction element 22.

As shown in FIG. 4, the first-order diffraction efficiency of the exit side diffraction element 22 is high, when the propagation angle within the light-guiding plate 20 is small, that is, with respect to light incident on the front surface 20c of the light-guiding plate 20 in a standing state. Accordingly, the imaging light G propagating within the light-guiding plate 20 in the standing state is efficiently exited outside from the exit side diffraction element 22.

Additionally, the first-order diffraction efficiency of the exit side diffraction element 22 is low, when the propagation angle within the light-guiding plate 20 is large, that is, with respect to light incident on the front surface 20c of the light-guiding plate 20 in the lying state. Accordingly, the imaging light G propagating within the light-guiding plate 20 in the lying state is unlikely to be exited outside from the exit side diffraction element 22.

Figure 5:
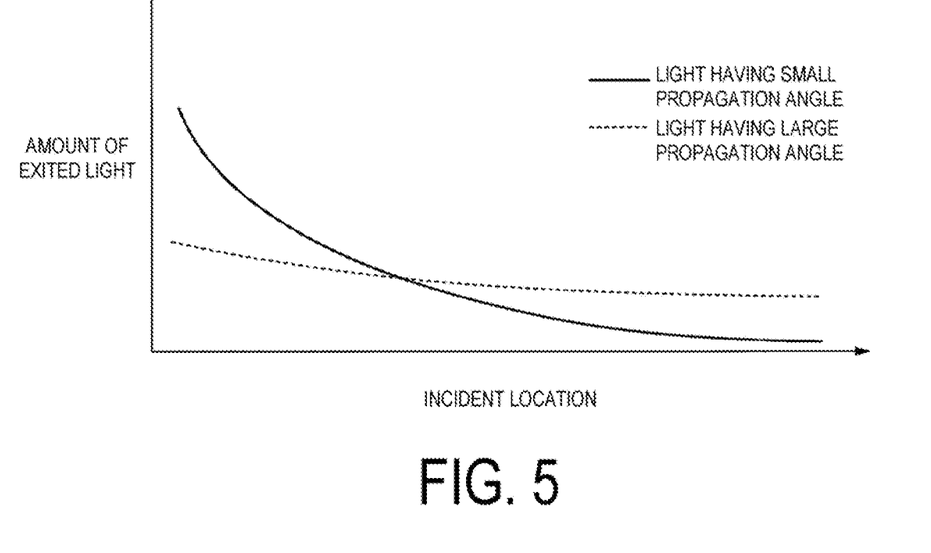
FIG. 5 is a diagram showing distribution of amount of exited light in a light propagation direction of the exit side diffraction element.

FIG. 5 is a diagram showing distribution of amount of exited light in a light propagation direction of an exit side diffraction element. FIG. 5 shows distribution of amount of exited light when a propagation angle is large and when the propagation angle is small.

Note that, in FIG. 5, a horizontal axis indicates incident position of the imaging light G in the exit side diffraction element 22, and a vertical axis indicates amount of light exited from the exit side diffraction element 22. Here, a light propagation direction of the exit side diffraction element 22 corresponds to a horizontal direction of the exit side diffraction element 22, a side close to the incident side diffraction element 21 of the exit side diffraction element 22 is referred to as a front side, and a side far from the incident side diffraction element 21 of the exit side diffraction element 22 is referred to as a back side.

As shown in FIG. 5, as for light having a small propagation angle, a large amount of light is exited outside on the front side of the exit side diffraction element 22, and a remaining amount of light within the light-guiding plate 20 decreases, and thus, an amount of light to be exited outside decreases greatly as the light proceeds to the back side of the exit side diffraction element 22.

Additionally, as shown in FIG. 5, as for light having a large propagation angle, small amount of light is exited outside on the front side of the exit side diffraction element 22, and a decrease in a remaining amount of light within the light-guiding plate 20 is small, and thus, a decrease in an amount of light to be exited outside decreases even on the back side of the exit side diffraction element 22.

When the configuration in which the exit side diffraction element 22 is directly formed at the front surface 20c of the light-guiding plate 20 in this manner is adopted, it can be seen that a difference occurs for the amount of light exited depending on a location in the exit side diffraction element 22. Considering this for a virtual image visible to the observer M, distribution of brightness within an angle of view varies greatly depending on a location of the eye in the horizontal direction parallel to the exit side diffraction element 22 (a Y direction illustrated in FIG. 3). That is, when the virtual image is viewed, unevenness in brightness occurs in the horizontal direction of the virtual image depending on the location of the eye.

In the image display unit 112 of the exemplary embodiment, the angle dependent reflective film 23 provided between the light-guiding plate 20 and the exit side diffraction element 22 is included, thus it is possible to reduce the unevenness in brightness occurring for the virtual image as described below.

Figure 6:
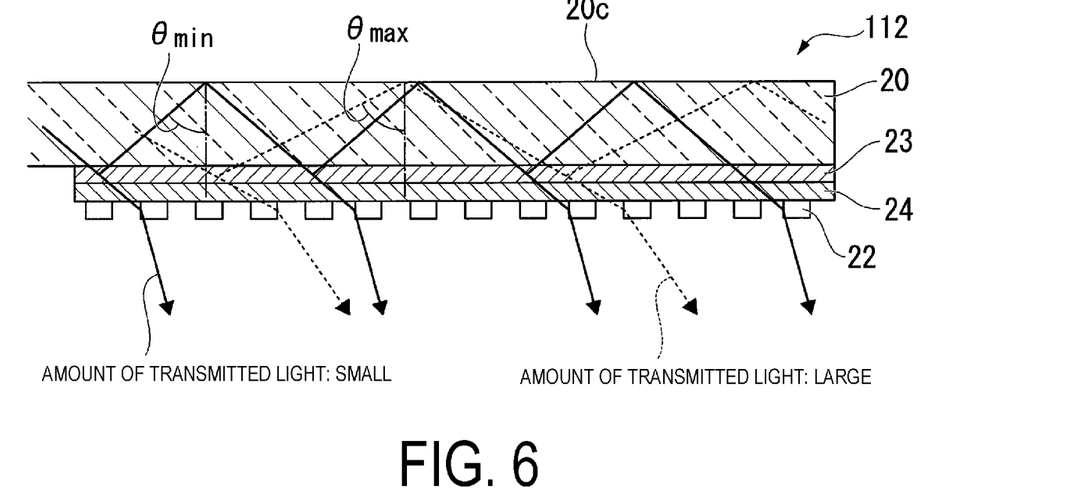
FIG. 6 is an enlarged cross-sectional view of a main portion of a light emitting part of a light-guiding plate.

FIG. 6 is an enlarged cross-sectional view of a main portion of a light emitting part of a light-guiding plate.

As illustrated in FIG. 6, the angle dependent reflective film 23 is provided at the light emitting part 20b of the light-guiding plate 20. The angle dependent reflective film 23 is provided between the light-guiding plate 20 and the exit side diffraction element 22. The angle dependent reflective film 23 is formed of a dielectric multilayer film. The angle dependent reflective film 23 has reflectance varying depending on the magnitude of a propagation angle of the imaging light G propagating within the light-guiding plate 20.

In the exemplary embodiment, a spacer layer 24 is disposed between the angle dependent reflective film 23 and the exit side diffraction element 22. The spacer layer 24 is configured to, when designing the angle dependent reflective film 23 formed of the dielectric multilayer film, facilitate design of the film, by sandwiching the angle dependent reflective film 23 between the light-guiding plate 20 and the spacer layer 24. Accordingly, as necessary, the spacer layer 24 can be omitted.

Figure 7:
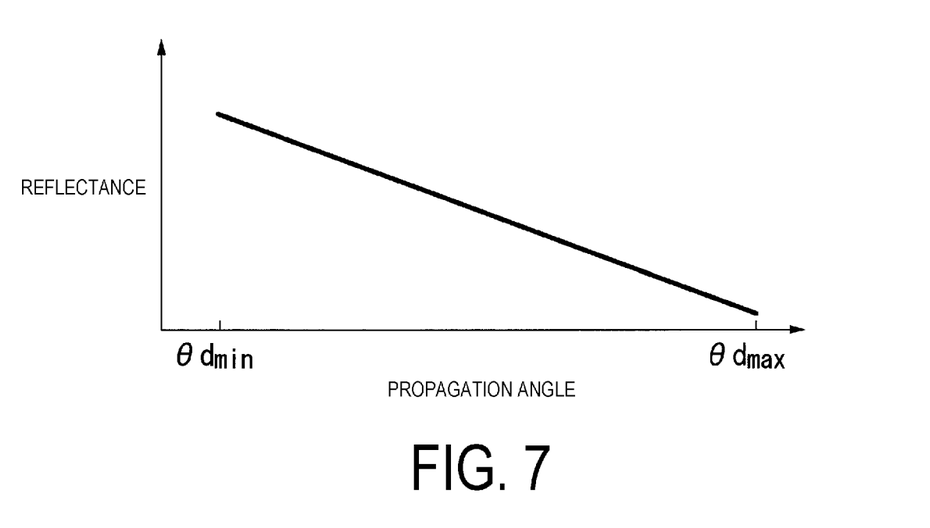
FIG. 7 is a diagram showing a reflectance characteristic of an angle dependent reflective film.

FIG. 7 shows a reflectance characteristic of an angle dependent reflective film. In FIG. 7, a horizontal axis indicates the propagation angle of the imaging light G within the light-guiding plate 20, and a vertical axis indicates reflectance of the angle dependent reflective film 23.

As shown in FIG. 7, as for the angle dependent reflective film 23, reflectance for the imaging light G propagating at a relatively small propagation angle is larger than reflectance for the imaging light G propagating at a relatively large propagation angle. In other words, in the angle dependent reflective film 23, an amount of light that passes through the film and reaches the exit side diffraction element 22 is limited, by increasing reflectance for light having a small propagation angle with high first-order diffraction efficiency in the exit side diffraction element 22. Accordingly, the angle dependent reflective film 23 returns the imaging light G into the light-guiding plate 20, and increases an amount of light reaching the back side of the exit side diffraction element 22.

In addition, in the angle dependent reflective film 23, the amount of light that passes through the film and reaches the exit side diffraction element 22 is not limited, by decreasing reflectance for light having a large propagation angle with low first-order diffraction efficiency in the exit side diffraction element 22. Accordingly, the angle dependent reflective film 23 suppresses a decrease in an amount of light reaching the front side of the exit side diffraction element 22.

Figure 8:
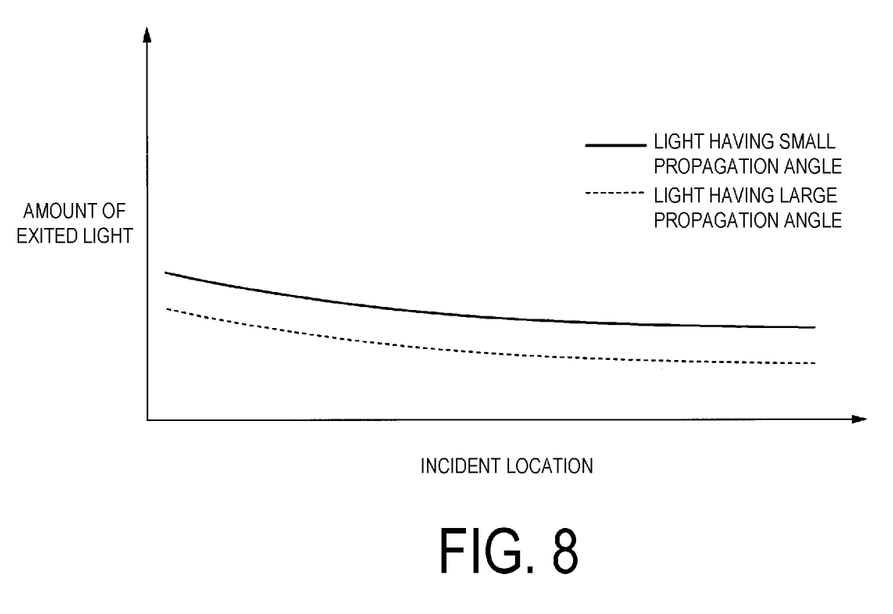
FIG. 8 is a diagram showing distribution of amount of exited light when the angle dependent reflective film is provided.

FIG. 8 is a diagram showing distribution of amount of exited light in the light propagation direction of the exit side diffraction element 22 when an angle dependent reflective film is provided.

According to the image display unit 112 of the exemplary embodiment, the angle dependent reflective film 23 is provided, and thus, as shown in FIG. 8, a difference between distribution of amount of exited light when a propagation angle is large and distribution of amount of exited light when the propagation angle is small can be reduced, compared to the case shown in FIG. 5.

Thus, according to the image display unit 112 of the exemplary embodiment, by providing the angle dependent reflective film 23, a difference for brightness distribution occurring within an angle of view depending on the location of the eye in the horizontal direction parallel to the exit side diffraction element 22 (the Y direction illustrated in FIG. 3) can be reduced. That is, when the virtual image is viewed, the unevenness occurring in the brightness in the horizontal direction of the virtual image depending on the location of the eye can be reduced.

Here, when the reflectance of the angle dependent reflective film 23 is too high, a see-through characteristic of external light in the image display unit 112 is impaired in some cases. Maximum reflectance of the angle dependent reflective film 23 of the exemplary embodiment may be set to, for example, from 50% to 90%. The maximum reflectance of the angle dependent reflective film 23 means reflectance for light for which an incident angle with respect to the angle dependent reflective film 23 decreases, that is, for example, light perpendicularly incident on the angle dependent reflective film 23.

By setting the maximum reflectance of the angle dependent reflective film 23 to be within the range described above, it is possible to ensure the see-through characteristic of the external light, without impairing the above-described effect of improving evenness of brightness of the virtual image.

In addition, in the exemplary embodiment, since the imaging light G is constituted by laser light having a single wavelength, a difference for diffraction efficiency does not occur when a wavelength of the imaging light G ranges in the incident side diffraction element 21 and the exit side diffraction element 22, and thus it is possible to further improve the evenness of brightness of the virtual image.

Note that, the propagation angle within the light-guiding plate 20 is determined by the incident angle of the imaging light G with respect to the incident side diffraction element 21. The incident angle of the imaging light G is determined by an angle of the MEMS mirror 10B in the imaging light generation part 10. Thus, the imaging light generation part 10, by controlling the light source 10A so as to adjust intensity of incident laser light as the imaging light G, can further reduce a difference between curves of the graph in FIG. 8, and further improve the evenness of brightness of the virtual image.

Second Exemplary Embodiment

Next, a second exemplary embodiment of the present disclosure will be described.

A basic configuration of an image display device according to the second exemplary embodiment is similar to that of the first exemplary embodiment, and a configuration of an image display unit is different from that in the first exemplary embodiment. Thus, an overall configuration of the image display device will be omitted, and the image display unit will be described.

Figure 9:
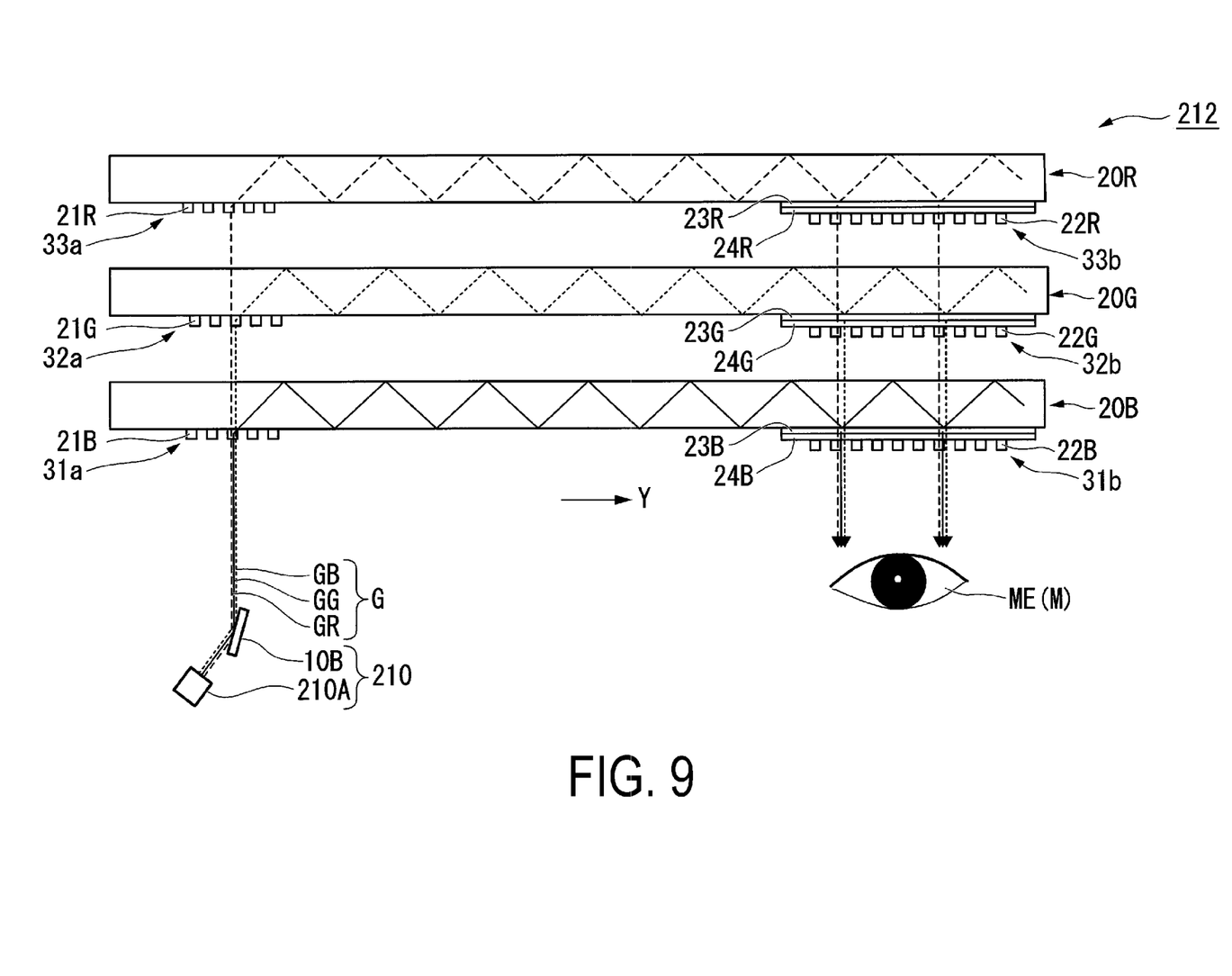
FIG. 9 is a horizontal cross-sectional view illustrating a schematic configuration of an image display unit according to a second exemplary embodiment.

FIG. 9 is a horizontal cross-sectional view illustrating a schematic configuration of the image display unit according to the second exemplary embodiment. Note that, in FIG. 9, components common to those of the drawings used for the first exemplary embodiment are assigned identical reference numerals, and detailed description thereof will be omitted.

As illustrated in FIG. 9, an image display unit 212 according to the exemplary embodiment includes an imaging light generation part 210, a first light-guiding plate 20B, a second light-guiding plate 20G, a third light-guiding plate 20R, a first incident side diffraction element 21B, a first exit side diffraction element 22B, a second incident side diffraction element 21G, a second exit side diffraction element 22G, a third incident side diffraction element 21R, a third exit side diffraction element 22R, a first angle dependent reflective film 23B, a second angle dependent reflective film 23G, and a third angle dependent reflective film 23R.

The imaging light generation part 210 of the exemplary embodiment includes a light source 210A, and an MEMS mirror 10B. The light source 210A includes a laser light source that emits red laser light, green laser light, and blue laser light. The red laser light is, for example, light having a peak wavelength of 638 nm, the green laser light is, for example, light having a peak wavelength of 520 nm, and the blue laser light is, for example, light having a peak wavelength of 450 nm.

The imaging light generation part 210 forms the imaging light G by scanning laser light of each the color exited from the light source 210A by the MEMS mirror 10B, and making the laser light incident on the light-guiding plate 20 in a time sequential manner. The imaging light generation part 210 of the exemplary embodiment generates the imaging light G by scanning laser light in a time sequential manner. The imaging light G includes multiple kinds of colored light. Specifically, the imaging light G includes blue imaging light (first colored light) GB constituted by the blue laser light, green imaging light (second colored light) GG constituted by the green laser light, and red imaging light (third colored light) GR constituted by the red laser light.

In the exemplary embodiment, the first light-guiding plate 20B, the second light-guiding plate 20G, and the third light-guiding plate 20R are provided in this order at respective locations close to the imaging light generation part 210.

The first light-guiding plate 20B propagates primarily the blue imaging light GB. Note that, since the first incident side diffraction element 21B is constituted with a grating period and a grating depth corresponding to blue light, first-order diffraction efficiency for each of the green imaging light GG and the red imaging light GR is suppressed, and an amount of transmitted light increases.

The first light-guiding plate 20B includes a first light incident part 31a and a first light emitting part 31b. The first incident side diffraction element 21B is provided at the first light incident part 31a of the first light-guiding plate 20B. The first exit side diffraction element 22B is provided at the first light emitting part 31b of the first light-guiding plate 20B.

The first incident side diffraction element 21B diffracts the blue imaging light GB and causes the blue imaging light GB incident on the first light-guiding plate 20B. The blue imaging light GB propagates within the first light-guiding plate 20B while being totally reflected, is diffracted by the first exit side diffraction element 22B, and is extracted outside. In the exemplary embodiment, respective grating periods of the first incident side diffraction element 21B and the first exit side diffraction element 22B are identical to each other.

The first incident side diffraction element 21B and the first exit side diffraction element 22B can be appropriately selected from a surface relief type diffraction grating or a volume hologram depending on required performance. The surface relief type diffraction grating has an advantage that high diffraction efficiency can be maintained over a wide angle range. In addition, the volume hologram has an advantage that high diffraction efficiency can be obtained. In the exemplary embodiment, the first incident side diffraction element 21B and the first exit side diffraction element 22B are each constituted by the surface relief type diffraction grating.

The first angle dependent reflective film 23B formed of a dielectric multilayer film is provided at the first light emitting part 31b of the first light-guiding plate 20B. The first angle dependent reflective film 23B is provided between the first light-guiding plate 20B and the first exit side diffraction element 22B. The first angle dependent reflective film 23B has reflectance varying depending on the magnitude of a propagation angle of the blue imaging light GB propagating within the first light-guiding plate 20B. A spacer layer 24B is disposed between the first angle dependent reflective film 23B and the first exit side diffraction element 22B.

As for the first angle dependent reflective film 23B, reflectance for the blue imaging light GB propagating at relatively small propagation angle is larger than reflectance for the blue imaging light GB propagating at a relatively large propagation angle. In the first angle dependent reflective film 23B, an amount of light of the blue imaging light GB incident on a back side of the first exit side diffraction element 22B is increased, by increasing reflectance for light having a small propagation angle with high first-order diffraction efficiency in the first exit side diffraction element 22B. In addition, the first angle dependent reflective film 23B suppresses a decrease in an amount of light of the blue imaging light GB incident on a front side of the first exit side diffraction element 22B, by decreasing reflectance for light having a large propagation angle with low first-order diffraction efficiency in the first exit side diffraction element 22B.

According to the image display unit 212 of the exemplary embodiment, by providing the first angle dependent reflective film 23B, a difference for brightness distribution occurring within an angle of view of the blue imaging light GB depending on the location of the eye in the horizontal direction parallel to the first exit side diffraction element 22B (the Y direction) can be reduced. That is, when a virtual image by the blue imaging light GB is viewed, unevenness occurring in brightness in the horizontal direction of the virtual image depending on the location of the eye can be reduced.

The second light-guiding plate 20G propagates primarily the green imaging light GG. The green imaging light GG is transmitted through the first light-guiding plate 20B and is incident on the second light-guiding plate 20G. Note that, since the first incident side diffraction element 21B is constituted with the grating period and the grating depth corresponding to the blue light, first-order diffraction efficiency for the green imaging light GG is suppressed, and an amount of transmitted light increases.

The second light-guiding plate 20G includes a second light incident part 32a and a second light emitting part 32b. The second incident side diffraction element 21G is provided at the second light incident part 32a of the second light-guiding plate 20G. The second exit side diffraction element 22G is provided at the second light emitting part 32b of the second light-guiding plate 20G.

The second incident side diffraction element 21G diffracts the green imaging light GG and causes the green imaging light GG incident on the second light-guiding plate 20G. The green imaging light GG propagates within the second light-guiding plate 20G while being totally reflected, is diffracted by the second exit side diffraction element 22G, and is extracted outside. In the exemplary embodiment, respective grating periods of the second incident side diffraction element 21G and the second exit side diffraction element 22G are identical to each other.

The second incident side diffraction element 21G and the second exit side diffraction element 22G can be appropriately selected from a surface relief type diffraction grating or a volume hologram depending on required performance. The surface relief type diffraction grating has an advantage that high diffraction efficiency can be maintained over a wide angle range. In addition, the volume hologram has an advantage that high diffraction efficiency can be obtained. In the exemplary embodiment, the second incident side diffraction element 21G and the second exit side diffraction element 22G are each constituted by the surface relief type diffraction grating.

The second angle dependent reflective film 23G is provided between the second light-guiding plate 20G and the second exit side diffraction element 22G. The second angle dependent reflective film 23G has reflectance varying depending on magnitude of a propagation angle of the green imaging light GG propagating within the second light-guiding plate 20G. A spacer layer 24G is disposed between the second angle dependent reflective film 23G and the second exit side diffraction element 22G.

As for the second angle dependent reflective film 23G, reflectance for the green imaging light GG propagating at a relatively small propagation angle is larger than reflectance for the green imaging light GG propagating at a relatively large propagation angle. In the second angle dependent reflective film 23G, an amount of light of the green imaging light GG incident on a back side of the second exit side diffraction element 22G is increased, by increasing reflectance for light having a small propagation angle with high first-order diffraction efficiency in the second exit side diffraction element 22G. In addition, the second angle dependent reflective film 23G suppresses a decrease in an amount of light of the green imaging light GG incident on a front side of the second exit side diffraction element 22G, by decreasing reflectance for light having a large propagation angle with low first-order diffraction efficiency in the second exit side diffraction element 22G.

According to the image display unit 212 of the exemplary embodiment, by providing the second angle dependent reflective film 23G, a difference for brightness distribution occurring within an angle of view of the green imaging light GG depending on the location of the eye in the horizontal direction parallel to the second exit side diffraction element 22G (the Y direction) can be reduced. That is, when a virtual image by the green imaging light GG is viewed, unevenness occurring in brightness in the horizontal direction of the virtual image depending on the location of the eye can be reduced.

The third light-guiding plate 20R propagates primarily the red imaging light GR. The red imaging light GR is transmitted through the first light-guiding plate 20B and the second light-guiding plate 20G and is incident on the third light-guiding plate 20R. The third light-guiding plate 20R includes a third light incident part 33a and a third light emitting part 33b. The third incident side diffraction element 21R is provided at the third light incident part 33a of the third light-guiding plate 20R. The third exit side diffraction element 22R is provided at the third light emitting part 33b of the third light-guiding plate 20R.

The third incident side diffraction element 21R diffracts the red imaging light GR and causes the red imaging light GR incident on the third light-guiding plate 20R. The red imaging light GR propagates within the third light-guiding plate 20R while being totally reflected, is diffracted by the third exit side diffraction element 22R, and is extracted outside. In the exemplary embodiment, respective grating periods of the third incident side diffraction element 21R and the third exit side diffraction element 22R are identical to each other.

The third incident side diffraction element 21R and the third exit side diffraction element 22R can be appropriately selected from a surface relief type diffraction grating or a volume hologram depending on required performance. The surface relief type diffraction grating has an advantage that high diffraction efficiency can be maintained over a wide angle range. In addition, the volume hologram has an advantage that high diffraction efficiency can be obtained. In the exemplary embodiment, the third incident side diffraction element 21R and the third exit side diffraction element 22R are each constituted by the surface relief type diffraction grating.

The third angle dependent reflective film 23R is provided between the third light-guiding plate 20R and the third exit side diffraction element 22R. The third angle dependent reflective film 23R has reflectance varying depending on magnitude of a propagation angle of the red imaging light GR propagating within the third light-guiding plate 20R. A spacer layer 24R is disposed between the third angle dependent reflective film 23R and the third exit side diffraction element 22R.

As for the third angle dependent reflective film 23R, reflectance for the red imaging light GR propagating at a relatively small propagation angle is larger than reflectance for the red imaging light GR propagating at a relatively large propagation angle. In the third angle dependent reflective film 23R, an amount of light of the red imaging light GR incident on a back side of the third exit side diffraction element 22R is increased, by increasing reflectance for light having a small propagation angle with high first-order diffraction efficiency in the third exit side diffraction element 22R. In addition, in the third angle dependent reflective film 23R, an amount of light of the red imaging light GR incident on a front side of the third exit side diffraction element 22R is increased, by decreasing reflectance for light having a large propagation angle with low first-order diffraction efficiency in the third exit side diffraction element 22R.

According to the image display unit 212 of the exemplary embodiment, by providing the third angle dependent reflective film 23R, a difference for brightness distribution occurring within an angle of view of the red imaging light GR depending on the location of the eye in a direction parallel to the third exit side diffraction element 22R (the Y direction) can be reduced. That is, when a virtual image by the red imaging light GR is viewed, unevenness occurring in brightness in a horizontal direction of the virtual image depending on the location of the eye can be reduced.

According to the image display unit 212 of the exemplary embodiment, the first angle dependent reflective film 23B corresponding to the blue imaging light GB, the second angle dependent reflective film 23G corresponding to the green imaging light GG, and the third angle dependent reflective film 23R corresponding to the red imaging light GR are included, thus a difference for brightness distribution occurring within an angle of view by a location of an eye in a direction parallel to each the exit side diffraction element 22 (the Y direction) can be reduced. That is, when the virtual image is viewed, the unevenness occurring in the brightness in the horizontal direction of the virtual image depending on the location of the eye can be reduced.

Thus, according to the image display unit 212 of the exemplary embodiment, a virtual image having even brightness can be made visible in full color to the eye ME of the observer M.

In the image display unit 212 of the exemplary embodiment, the imaging light generation part 210 may adjust intensity of the blue imaging light GB, the green imaging light GG, and the red imaging light GR, based on diffraction efficiency of light-guiding optical systems 220B, 220G, and 220R, respectively.

In the image display unit 212 of the exemplary embodiment, three number of the angle dependent reflective films 23B, 23G, and 23R exist between the eye and the external world. Thus, when the see-through characteristic is to be ensured, the maximum reflectance of each the reflective film needs to be set to be lower, compared to the case of the first exemplary embodiment. In the exemplary embodiment, the maximum reflectance of each of the angle dependent reflective films 23B, 23G, and 23R may be set to, for example, from 40% to 70%. By setting the maximum reflectance of each of the angle dependent reflective films 23B, 23G, and 23R to be within the range described above, it is possible to ensure a see-through characteristic of external light, while improving evenness of brightness of a virtual image.

Note that the technical scope of the present disclosure is not limited to the above-described exemplary embodiment, and various modifications can be made to the above-described exemplary embodiment without departing from the spirit and gist of the present disclosure.

For example, in the first and second exemplary embodiments described above, the example is given of the configuration in which the imaging light generation part 10 or 210 two dimensionally scans the laser light to form the imaging light, however, an imaging light generation part may be configured with an image display device such as a liquid crystal display device, an organic EL display device, or the like.

In addition, in the exemplary embodiment described above, the see-through type image display device is used as an example, but the present disclosure can also be applied to an image display device that does not have a see-through characteristic. When a see-through characteristic is not necessary, maximum reflectance of an angle dependent reflective film is not particularly limited.

What is claimed is:

1. An image display device, comprising:
   an imaging light generator configured to generate an imaging light having a single color;
   a light-guiding plate;
   an incident side diffraction element provided at a light incident part of the light-guiding plate, and configured to cause the imaging light to enter the light-guiding plate;
   an exit side diffraction element provided at a light emitting part of the light-guiding plate, and configured to cause the imaging light propagating within the light-guiding plate to exit; and
   an angle dependent reflective film provided between the light-guiding plate and the exit side diffraction element, and having a reflectance varying depending on a magnitude of a propagation angle of the imaging light propagating within the light-guiding plate, wherein
   the reflectance of the angle dependent reflective film for the imaging light propagating at a relatively small propagation angle is larger than the reflectance of the angle dependent reflective film for the imaging light propagating at a relatively large propagation angle,
   respective exit angles of the imaging light exiting from the exit side diffraction element are identical to respective incident angles of the imaging light incident on the incident side diffraction element, respectively,
   the imaging light including a first imaging light that propagates within the light-guiding plate at a minimum propagation angle, a second imaging light that propagates within the light-guiding plate at a maximum propagation angle, and a third imaging light that propagates within the light-guiding plate at a propagation angle between the minimum propagation angle and the maximum propagation angle, and
   the reflectance of the angle dependent reflective film for the first imaging light is larger than the reflectance of the angle dependent reflective film for the third imaging light, and the reflectance of the angle dependent reflective film for the third imaging light is larger than the reflectance of the angle dependent reflective film for the second imaging light.

2. The image display device according to claim 1, wherein at least one of the incident side diffraction element and the exit side diffraction element is a surface relief type diffraction grating.

3. The image display device according to claim 1, wherein at least one of the incident side diffraction element and the exit side diffraction element is a volume hologram.

4. The image display device according to claim 1, wherein a light source of the imaging light is laser light.

5. An image display device, comprising:
an imaging light generator configured to generate an imaging light including a first colored light, a second colored light, and a third colored light;
a first light-guiding plate;
a first incident side diffraction element provided at a first light incident part of the first light-guiding plate, and on which the first colored light is incident;
a first exit side diffraction element provided at a first light emitting part of the first light-guiding plate, and configured to cause the first colored light propagating within the first light-guiding plate to exit;
a first angle dependent reflective film provided between the first light-guiding plate and the first exit side diffraction element, and having a reflectance varying depending on a magnitude of a propagation angle of the first colored light propagating within the first light-guiding plate;
a second light-guiding plate;
a second incident side diffraction element provided at a second light incident part of the second light-guiding plate, and on which the second colored light is incident;
a second exit side diffraction element provided at a second light emitting part of the second light-guiding plate, and configured to cause the second colored light propagating within the second light-guiding plate to exit;
a second angle dependent reflective film provided between the second light-guiding plate and the second exit side diffraction element, and having a reflectance varying depending on the magnitude of a propagation angle of the second colored light propagating within the second light-guiding plate;
a third light-guiding plate;
a third incident side diffraction element provided at a third light incident part of the third light-guiding plate, and on which the third colored light is incident;
a third exit side diffraction element provided at a third light emitting part of the third light-guiding plate, and configured to cause the third colored light propagating within the third light-guiding plate to exit; and
a third angle dependent reflective film provided between the third light-guiding plate and the third exit side diffraction element, and having a reflectance varying depending on the magnitude of a propagation angle of the third colored light propagating within the third light-guiding plate, wherein
the reflectance of the first angle dependent reflective film for the first colored light propagating within the first light-guiding plate at a relatively small propagation angle is larger than the reflectance of the first angle dependent reflective film for the first colored light propagating within the first light-guiding plate at a relatively large propagation angle,
respective exit angles of the first colored light exiting from the first exit side diffraction element are identical to respective incident angles of the first colored light incident on the first incident side diffraction element, respectively,
the first colored light including a first colored minimum propagation angle light that propagates within the first light-guiding plate at a first minimum propagation angle, a first colored maximum propagation angle light that propagates within the first light-guiding plate at a first maximum propagation angle and a first colored propagation angle light that propagates within the first light-guiding plate at a first propagation angle between the first minimum propagation angle and the first maximum propagation angle,
the reflectance of the first angle dependent reflective film for the first colored minimum propagation angle light is larger than the reflectance of the first angle dependent reflective film for the first colored propagation angle light, and the reflectance of the first angle dependent reflective film for the first colored propagation angle light is larger than the reflectance of the first angle dependent reflective film for the first colored maximum propagation angle light,
the reflectance of the second angle dependent reflective film for the second colored light propagating within the second light-guiding plate at a relatively small propagation angle is larger than the reflectance of the second angle dependent reflective film for the second colored light propagating within the second light-guiding plate at a relatively large propagation angle,
respective exit angles of the second colored light exiting from the second exit side diffraction element are identical to respective incident angles of the second colored light incident on the second incident side diffraction element, respectively,
the second colored light including a second colored minimum propagation angle light that propagates within the second light-guiding plate at a second minimum propagation angle, a second colored maximum propagation angle light that propagates within the second light-guiding plate at a second maximum propagation angle, and a second colored propagation angle light that propagates within the second light-guiding plate at a second propagation angle between the second minimum propagation angle and the second maximum propagation angle,
the reflectance of the second angle dependent reflective film for the second colored minimum propagation angle light is larger than the reflectance of the second angle dependent reflective film for the second colored propagation angle light, and the reflectance of the second angle dependent reflective film for the second colored propagation angle light is larger than the reflectance of the second angle dependent reflective film for the second colored maximum propagation angle light,
the reflectance of the third angle dependent reflective film for the third colored light propagating within the third light-guiding plate at a relatively small propagation angle is larger than the reflectance of the third angle dependent reflective film for the third colored light propagating within the third light-guiding plate at a relatively large propagation angle,
respective exit angles of the third colored light exiting from the third exit side diffraction element are identical to respective incident angles of the third colored light incident on the third incident side diffraction element, respectively,
the third colored light including a third colored minimum propagation angle light that propagates within the third light-guiding plate at a third minimum propagation angle, a third colored maximum propagation angle light that propagates within the third light-guiding plate at a third maximum propagation angle and a third colored propagation angle light that propagates within the third light-guiding plate at a third propagation angle between the third minimum propagation angle and the third maximum propagation angle, and the reflectance of the third angle dependent reflective film for the third colored minimum propagation angle light is larger than the reflectance of the third angle dependent reflective film for the third colored propagation angle light, and the reflectance of the third angle dependent reflective film for the third colored propagation angle light is larger than the reflectance of the third angle dependent reflective film for the third colored maximum propagation angle light.

6. The image display device according to claim 5, wherein at least one of the first incident side diffraction element, the second incident side diffraction element, the third incident side diffraction element, the first exit side diffraction element, the second exit side diffraction element, and the third exit side diffraction element is a surface relief type diffraction grating.

7. The image display device according to claim 5, wherein at least one of the first incident side diffraction element, the second incident side diffraction element, the third incident side diffraction element, the first exit side diffraction element, the second exit side diffraction element, and the third exit side diffraction element is a volume hologram.

\* \* \* \* \*